Jan. 16, 1951     H. A. TENN     2,538,484
SWIM-ACTION FISH LURE
Filed May 3, 1949
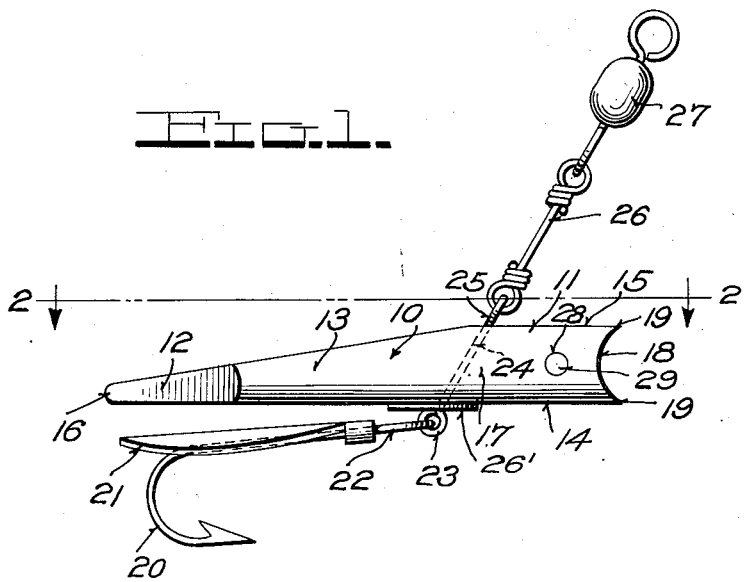
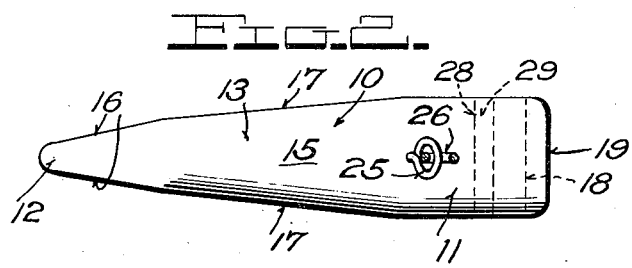
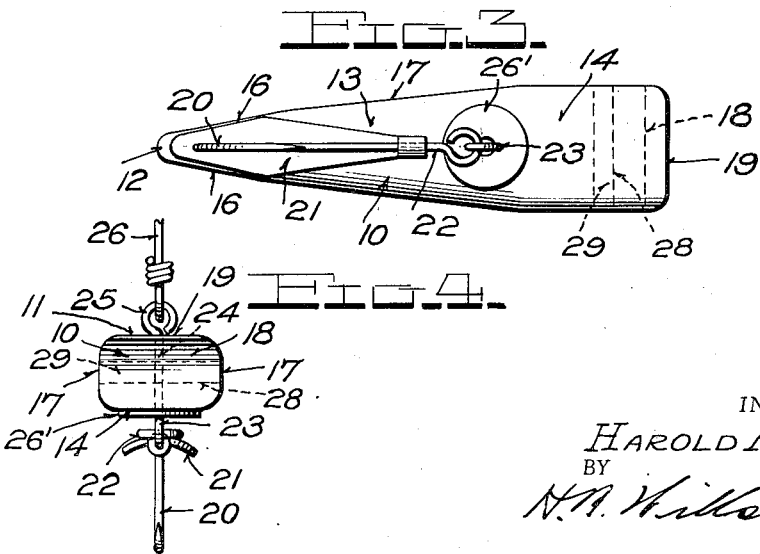
INVENTOR.
HAROLD A. TENN,
BY
ATTORNEYS Patented Jan. 16, 1951

2,538,484

UNITED STATES PATENT OFFICE 2,538,484

SWIM-ACTION FISH LURE

Harold A. Tenn, Honolulu, Territory of Hawaii

Application May 3, 1949, Serial No. 91,120

1 Claim. (Cl. 43—42.45)

My invention relates to fish baits or lures, and more particularly to those of the artificial minnow type.

The principal object of the invention is to provide a simple, rugged, multi-action lure which will be effective in any kind of water and usable for either casting or trolling.

Another object of the invention is to provide a lure of this character which when drawn through the water will wiggle horizontally with a regular and rhythmical action and at the same time weave from one side to the other and continuously change its depth going down and then coming up to break water, without creating air pockets or throwing a wake of foam and without any spinning action.

Further objects are to provide in a lure of this character, an improved head construction, an improved body construction and improved means for connecting the hook and line through the lure so that there will be no hook drag or load carried by the lure.

The above and other objects and advantages of the invention will be apparent from the following description, reference being had to the accompanying drawings, wherein a preferred embodiment of one form of the present invention is clearly shown.

In the drawings:

Fig. 1 is a side elevation of the lure showing the hook in the position it will assume when the lure is drawn through the water and also showing a suitable flexible linkage connection for the attachment of a fishing line.

Fig. 2 is a horizontal section taken on line 2—2 of Fig. 1,

Fig. 3 is a bottom plan view of the lure and hook the parts being in the position shown in Fig. 1, and Fig. 4 is a front end view of parts shown in Fig. 1.

Referring more in detail to the drawings, it will be seen that the lure 10 has a generally rectangular head portion 11, a tapered tail portion 12 and an intermediate body portion 13. The bottom face 14 of the lure from the front end of its head to the tip of its tail is flat or disposed in a single plane. The head 11 constitutes approximately one-fourth of the length of the lure so that the remaining three-fourths of the length form the body and tail portions. In the preferred construction the tail 12 constitutes approximately one-fourth of the length although when it is made longer the body portion 13 is correspondingly shortened since these portions merge to give the lure a rearwardly tapered and reduced body as will be seen on reference to Figs. 1 and 2. The top face 15 of the head 11 is flat and parallel with the bottom face 14 while the remaining portion of the top of the lure is also flat but tapers downward from the head to the extremity of the tail and hence converges toward the flat bottom 14. Viewed from the top the lure is also tapered rearwardly from the head 11 to the slightly rounded end of the tail, but the tail portion 12 has its opposite side or vertical faces 16 flat. These flat sides or faces 16 which might be slightly concave form sharp corners or edges where they meet the flat top and bottom faces of the lure for a purpose hereinafter explained. The side faces or walls 17 of both the head and body portions of the lure are preferably rounded as shown in Fig. 4 from the flat bottom to the flat top of the lure although they may be somewhat flat with rounded edges where they merge into the bottom and top of the lure. The front end of the rectangular head portion 11 is formed with a horizontal concave recess or channel 18 which extends transversely from one side to the other of the head portion. The uniformly curved wall of this recess is cylindrical in form with its axis perpendicular to the central longitudinal axis of the body portion, and it forms, in connection with the top and bottom surfaces of the head portion, upper and lower transverse lips of the same size and shape with straight parallel edges 19 disposed in a transverse vertical plane perpendicular to the longitudinal axis of the body portion.

A fish hook 20 which may be either single or double is loosely or pivotally suspended from the bottom of the lure and carries a small spoon 21 so shaped and arranged that it forms a "lifter" for the hook causing it to assume the substantially horizontal position shown in Fig. 1 when the lure is drawn through the water. The hook has the usual eye 22 which is engaged with an eye or other tie or fastening means 23 formed on the lower end of a leader 24 extending upwardly through the lure at an angle of about 45°, the upper end of the leader having a tie or fastening means for the attachment of a fishing line. The leader 24 may be a wire or rod firmly secured in the downwardly and rearwardly extending opening of the body with the eye 23 at one end and a similar eye or loop 25 at its other end. If desired a washer 26 may be placed between the eye 23 and the bottom 14, and a similar washer may be placed beneath the eye 25. The eye 23 has its opening extending transversely so that the hook 20 may swing freely while the eye 25 has its opening extending longitudinally for the reception of an eye on a link or swivel or other suitable connection for a fishing line (not illustrated). As shown in Fig. 1 a link 26 has one end connected to the eye 25 and its other end to a well known form of swivel 27 but any suitable flexible connection may be provided between the leader and the fishing line. It will be noted that the diagonally positioned leader 24 extends in the vertical plane of the central longitudinal axis of the lure and that its line tie 25 is at the transverse center of the top of the lure and at the rear of the head 11 or about one-fourth of the length of the lure from its blunt front end. That arrangement of the leader also positions the fish hook tie 27 in the transverse center of the bottom of the lure and to the rear of the line tie.

The lure may be made of wood, plastic, metal or other materials but when it is desired to have the lure float when not in motion it should be made of light wood. It may of course be suitably colored or decorated and may be made in different sizes. Formed in the front portion of the head 11 is a transverse bore 28 to receive a removable cylindrical weight 29. The bore or opening extends through the central longitudinal axis of the lure adjacent the hollowed end 18 and the weight is sufficient to make the lure float or sink head down without the hook being attached.

The lure may be used for either casting or trolling. When it is pulled through the water the recessed end 18 resists the forward speed of the lure and might be termed a "resister." The water pressure on it causes the head 11 to be pushed down because of the weight 29 and the free pivotal suspension of the lure at the transverse center of the rear part of the head and at this position the flat top 15 of the head becomes a depressor which causes the lure to dive. When the lure rolls to one side the flat top of the head becomes a deflector causing the lure to weave or move laterally to either side of the line of pull, and when the lure rolls completely over the said flat area 15 becomes an elevator causing the lure to rise. The horizontal wiggling movement is caused by the "resister" 18 and the manner of connecting the line to the lure at the center of the rear part of the head. As the lure is pulled through the water it seeks the path of least resistance and the path of least resistance for the "resister" as it faces straight forward is to swing to one side. At that position or angle the path of least resistance is to reverse. This action keeps on repeating and causes a vigorous wiggle which is regular or rhythmical due to the shape of the two identical lips 19. This rhythmic action sets up a disturbance in the water very much like the disturbance caused by the tail of a fish as it swims. I have found that by rounding the side walls 17 or at least the corners or edges of both the head and the body portions there is a minimum of resistance against the rhythmic wiggling action caused by the "resister" 18; and also by making the side walls 16 of the tail flat and perpendicular with sharp corners or edges, the lure will be prevented from spinning. By reason of the shape of the lure and the manner of suspending it, the above described actions take place, that is, when the lure is drawn through the water it will continuously wiggle from right to left with a regular rhythmic action while it weaves from one side to the other of the line of pull of the fishing line and changes its depth alternately going down and coming up to break water. By many experiments I have found that the lure will not spin because of the shape of the tail portion as above described; and that no air pockets or foaming wake will be created because of the design of the head portion and because there is no hook load or drag to impede the action, the leader eye being located back of the head as shown. The free swinging attachment of the hook directly to the leader which extends diagonally in a forward and rearward direction as shown through the body of the lure and the freely flexible connection of the line to the top of the leader, provides in connection with the shape of the body, a very simple, rugged, multi-action lure that can be used in any kind and condition of water and has been found to be very effective for either casting or trolling.

While one preferred embodiment of the invention has been shown and described in detail, it is to be understood that variations in the form, proportion and arrangement of parts are possible and contemplated within the spirit of the invention and the scope of the claim which follows.

I claim:

A fish lure of the character described comprising an elongated, relatively flat, buoyant body having a head portion of generally rectangular shape in cross section with its longitudinal edges rounded, said head portion having a vertical height approximately one-half of its width and also having its flat top parallel with the flat bottom of the body, the latter having a tail portion with rearwardly converging flat sides perpendicular to the flat bottom and top surfaces of said head portion, the front end of said head portion having a horizontal concave recess extending transversely from one side to the other of said head portion, the curved wall of said recess being cylindrical in form with its axis perpendicular to the central longitudinal axis of the body and forming in connection with the top and bottom surfaces of the head portion upper and lower transverse lips of the same size and shape, said lips having straight and parallel edges disposed in a transverse vertical plane perpendicular to the longitudinal axis of the body, a line tie on the top of the body disposed at its transverse center and adjacent the rear of said head portion, a fish hook tie on the bottom of said body disposed at its transverse center and rearward of said line tie, and a weight in said head portion in advance of said line tie.

HAROLD A. TENN.

REFERENCES CITED

The following references are of record in the file of this patent:

UNITED STATES PATENTS

| Number | Name | Date |
|---|---|---|
| 1,394,313 | Leeper | Oct. 18, 1921 |
| 1,522,450 | Hayes | Jan. 6, 1925 |
| 1,558,470 | Gibson | Oct. 27, 1925 |
| 1,692,935 | Heddon | Nov. 27, 1928 |
| 1,840,273 | Lang | Jan. 5, 1932 |
| 2,277,553 | Malmborg | Mar. 24, 1942 |

FOREIGN PATENTS

| Number | Country | Date |
|---|---|---|
| 854,302 | France | Apr. 10, 1940 |